United States Patent [19]

Cannon

[11] 4,445,455

[45] May 1, 1984

[54] DIAL ADJUSTMENT AND CALIBRATION OF OVEN CONTROL DEVICES

[75] Inventor: Trever E. Cannon, Georgetown, Canada

[73] Assignee: Camco Inc., Weston, Canada

[21] Appl. No.: 421,565

[22] Filed: Sep. 22, 1982

[51] Int. Cl.$^3$ ............................................. G01K 15/00
[52] U.S. Cl. ..................................... 116/216; 116/292; 116/307; 374/1
[58] Field of Search ............... 116/307, 291, 292, 216; 73/1 F; 236/1 R, 1 A; 374/1

[56] References Cited

U.S. PATENT DOCUMENTS

| | | | |
|---|---|---|---|
| 2,658,380 | 11/1953 | Evans | 374/1 |
| 2,995,105 | 8/1961 | Maltby | 116/314 |
| 3,109,411 | 11/1963 | Fuhrman | 116/292 |
| 3,176,541 | 4/1965 | Keeling, Sr. et al. | 116/320 X |

FOREIGN PATENT DOCUMENTS 700337 12/1964 Canada .............................. 116/292

Primary Examiner—Gerald Goldberg
Assistant Examiner—Hezron Williams
Attorney, Agent, or Firm—Raymond A. Eckersley

[57] ABSTRACT

The present invention relates to the calibration of a thermostat used for controlling the temperature of an oven. Calibration is provided for in the invention by two slots cut out in the oven wall or range faceplate through which screws pass to mount the thermostat to this wall or faceplate. Also passing through this wall or faceplate is the operating shaft of the thermostat to which the control knob will be attached. The screws further position an indicating dial. The screws may be loosened to allow the thermostat to be rotated relative to the oven wall. The indicating means is rotatable with the thermostat relative to the oven wall. A reference point is provided on the oven wall so that the amount of recalibration is readily determined. The present thermostat provides a novel calibration arrangement.

8 Claims, 3 Drawing Figures

U.S. Patent   May 1, 1984   4,445,455
FIG. 1.
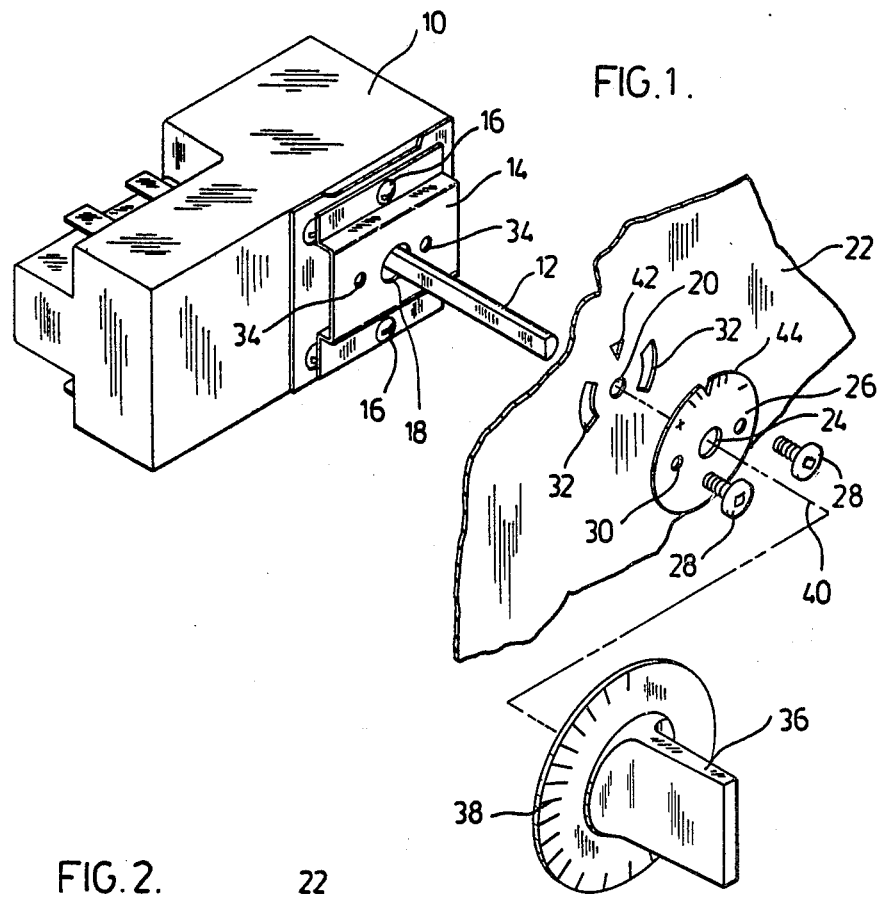
FIG. 2.
FIG. 3.
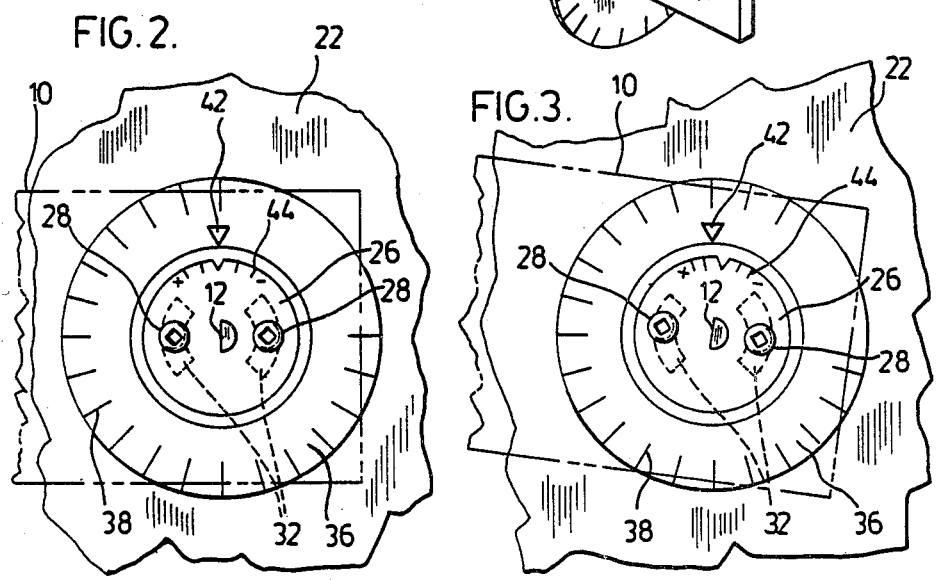

DIAL ADJUSTMENT AND CALIBRATION OF OVEN CONTROL DEVICES

The present invention relates to the calibration of a temperature control device that regulates the operating temperature of the heating device. In particular, the present invention relates to the calibration of a thermostat used for regulating the operating temperature of an oven.

Oven service repairmen are frequently called upon by consumers to calibrate the operating temperature of the consumers' ovens. Commonly, this calibration involves adjusting a screw to vary the contact pressure on a Bourdon tube, a diastat, or diaphragm. This calibration method has many disadvantages associated with it one of which is that the calibration screw in most cases is imbeded in the center of the operating shaft of the thermostat. This makes access to the screw difficult and may also result in the shaft weakening. Of course in smaller diameter shafts the use of a calibration screw is quite impractical. Also, another disadvantage associated with this method of adjusting the calibration of the oven is that it upsets the operational point set at the manufacturing sight and the control thermostat could fail to work if improperly adjusted. Lastly, such adjustments in the oven calibration usually require operating the oven for at least three cycles (25 to 30 minutes per cycles) in order to determine the actual temperature of the oven relative to that indicated on the control knob. Thus, such a method of calibration is costly to the consumer in respect of the time taken by the service repairmen to effect the calibration.

Another existing method of calibration is disclosed in U.S. Pat. No. 3,176,541, issued Apr. 6, 1965, to Keeling et al. The method of calibration disclosed in this patent involves rotating a dial relative to the hub of a control knob attached to the end of an operating shaft of a thermostat. The dial is secured in a fixed position by a calibration arm which is secured to the hub of the knob. The calibration arm is provided with a tongue which passes through a corresponding slot on the face of the dial. To calibrate the oven the tongue of the calibration arm is removed from the slot, and the dial is rotated relative to the calibration arm and the knob until another slot in the dial aligns itself with the tongue. The tongue may then be slipped into this other slot to complete the calibration of the oven. A decorative insert is placed over the slots so that they are not visable. The dial is provided with a temperature scale which is rotated relative to a reference point on the faceplate of the oven during the calibration. While this patent discloses a calibration for an oven that may be readily adjusted in the field, such an arrangement tends to be materially expensive in that is uses a number of different parts for knob and the dial having the temperature scale.

It is therefore an object of the present invention to provide a temperature control device which may be readily calibrated in the field by a service repairman and is relatively inexpensive in terms of material costs.

Briefly stated, the present invention involves rotating the temperature control device of a heating means relative to the wall or faceplate of the heating means to effect an adjustment of the calibration.

While the preferred embodiment of the present invention provides for the rotation of the temperature control device about an axis defined by the axis of the operating shaft of the control device, it is envisaged that the control device may be rotated about another point as long as the operating shaft passes through a sloted aperture in the wall of the heating means. In the preferred construction, to effect rotation of the control device about the axis of the operating shaft two arcuate slots are provided in the faceplate on either side of the faceplate aperture through which the operating shaft passes. Fastening means pass through the slotted apertures and fasten the temperature control device in a first positioned relation with respect to the wall. The fastening means may be loosened to effect the rotation of the temperature control device. The length of the slots determines the amount of rotation which the thermostat control device may undergo, and therefore the amount of calibration adjustment. In the preferred embodiment of the invention the control knob and temperature dial are of one piece construction and are attached to the operating shaft. In the preferred embodiment the temperature dial covers the fastening means and the knob is removably attached to the operating shaft to facilitate access to the fastening means. In an alternate construction it is envisaged that the temperature dial would not cover the fastening means, and, therefore, the knob would not have to be removably attached but could be fixedly attached to the operating shaft. Also, in the preferred construction the arcuate slots are located proximate to the aperture through which the operating shaft passes, but such slots do not necessarily have to be located close to this aperture. Additionally, in the preferred construction an indicating means in the form of a dial is secured to the outside surface of the wall or faceplace by the fastening means. When the fastening means are loosened to allow the temperature control device to be rotated relative to the wall, the dial rotates with the temperature control device relative to the wall. A reference point is provided on the wall and indicia are provided on the dial so that an accurate reading of the calibration temperature is visually given to the service repairman and user.

For a better understanding of the nature and objects of the present invention, reference may be had by way of example to the accompanying diagrammatic drawings in which:

FIG. 1 is an exploded perspective view of the oven control device of the present invention;

FIG. 2 is a front view showing the oven control device mounted to the wall of the oven in a first positioned relation; and, FIG. 3 is a front view showing the oven control device mounted to the wall of the oven in a second positioned relation.

Referring to the figures the preferred embodiment of the present invention is described. A temperature control device or thermostat 10 is provided for an oven (not shown). The thermostat 10 includes an operating shaft 12 which can be manipulated to adjust the predetermined temperature for which the thermostat 10 will regulate the operating temperature of the oven. Attached to the thermostat 10 is a metal bracket 14 which is attached by means of screws 16 passing through corresponding apertures in bracket 14. The operating shaft 12 passes through a central aperture 18 in the bracket 14 and also passes through a central aperture 20 in the oven or faceplate 22. Aligned with the central aperture 20 of the oven wall 22 is a central aperture 24 of an indicating means or dial 26. Dial 26 and thermostat 10 are mounted normally in a first positioned relation with wall 22 substantially as illustrated in FIG. 2. This is accomplished by a fastening means illustrated by screws 28 passing through mounting apertures 30 of dial 26, arcuate slots 32 of wall 22, and apertures 34 in the bracket 14. Attached to the end of the operating shaft 12 is a knob and dial 36. The knob and dial 36 has a temperature scale 38 marked thereon. The knob 36 has a hub portion (not illustrated) which is removably attached to the end of the operating shaft 12.

To effect the calibration of the oven by a service repairman, the service repairman first removes the knob and dial 36 from the end of operating shaft 12. The repairman then loosens screws 28, rotates the indicating dial 26 thereby rotating the thermostat 10 relative to the wall 22 of the oven. As illustrated, this rotational movement occurs about an axis 40 defined by the axis of the operating shaft 12. The rotation of the indicating dial 26 and thermostat 10 is limited by the length of arcuate slots 32. A reference point 42 is provided on the wall 22 which point can be compared with the indicia 44 on the dial 26. For each of the indicia that the indicating dial 26 is rotated either clock-wise or counter clockwise, a change in the oven of a temperature of either plus or minus 5° C. will be effected. The screws 28 may then be tightened to mount the thermostat 10 in a second positioned relation with respect to the wall 22 as illustrated, for example, in FIG. 3. The knob 36 may then be reattached to the end of the operating shaft 12.

The preferred embodiment provides a calibration method that is readily accomplished by a service repairman and is inexpensive in terms of material costs.

It should be understood that alternate embodiments may be readily apparent to a man skilled in the art in view of the foregoing description. Accordingly, the present invention should only be limited to that which is claimed in the accompanying claims.

What I claim as new and desire to secure by Letters Patent of the United States is:

1. A temperature control device for regulating the operating temperature of a heating device to a predetermined temperature value, said temperature control device including an operating shaft adapted to pass through an aperture in a wall of said heating device and a knob attached to said operating shaft for adjusting by manipulation of said operating shaft said predetermined temperature value, cooperating indicating means on said wall and said knob, and means for mounting said temperature control device in a first fixed position relative to said wall, said means for mounting being adapted to be released to permit rotation of said temperature control device relative to said wall and for refixing said temperature control device in a second fixed position angularly displaced from said first position relative to said wall so as to provide for adjustment of the calibration of said temperature control device.

2. The temperature control device of claim 1 wherein said temperature control device is rotatably moveable about an axis defined by the axis of said operating shaft.

3. The temperature control device of claim 1 wherein said wall is provided with arcuate slots through which a respective fastening means passes to mount said temperature control means to said wall, and each of said fastening means is accessable from outside said heating device.

4. The temperature control device of claim 3 wherein an indicating means is secured to the outside of said wall by at least one of said fastening means and said indicating means is capable of rotating with said temperature control device relative to said wall so as to provide an indication of the amount of adjustment of the calibration.

5. The temperature control device of claim 4 wherein said wall is provided with a reference point with which said indicating means is compared.

6. The temperature control device of claim 3 wherein said slots are positioned in close proximity to the aperture in said wall, and said knob includes as a unitary part thereof a temperature dial which overlays said slots, said knob is removably secured with said shaft.

7. The temperature control device of claim 6 wherein an indicating means is secured to the outside of said wall by at least one of said fastening means and said indicating means is capable of rotating with said temperature control device relative to said wall so as to provide an indication of the amount of adjustment of the calibration.

8. The temperature control device of claim 1 or 2 wherein said temperature control device further includes an indicating means secured to the outside wall of said heating means and capable of rotation with said temperature control device relative to said wall to provide an indication of the amount of adjustment of the calibration.

* * * * *